United States Patent
Cao et al.

(10) Patent No.: US 8,759,994 B2
(45) Date of Patent: Jun. 24, 2014

(54) METHOD OF CONTROLLING A WIND TURBINE GENERATOR AND APPARATUS FOR CONTROLLING ELECTRIC POWER GENERATED BY A WIND TURBINE GENERATOR

(75) Inventors: Shu Yu Cao, Singapore (SG); Anshuman Tripathi, Singapore (SG); Kim B. Larsen, Hadsund (DK); Gert Karmisholt Andersen, Hovedgård (DK); Lars Helle, Suldrup (DK)

(73) Assignee: Vestas Wind Systems A/S, Aarhus N (DK)

( * ) Notice: Subject to any disclaimer, the term of this patent is extended or adjusted under 35 U.S.C. 154(b) by 41 days.

(21) Appl. No.: 13/496,858

(22) PCT Filed: Sep. 14, 2010

(86) PCT No.: PCT/SG2010/000338
§ 371 (c)(1),
(2), (4) Date: May 11, 2012

(87) PCT Pub. No.: WO2011/034500
PCT Pub. Date: Mar. 24, 2011

(65) Prior Publication Data
US 2012/0217747 A1 Aug. 30, 2012

(30) Foreign Application Priority Data

Sep. 18, 2009 (DK) .............................. 2009 010044

(51) Int. Cl.
*H02P 9/04* (2006.01)
(52) U.S. Cl.
USPC ........................................................ 290/44
(58) Field of Classification Search
USPC ............................... 290/44, 55; 700/286–290
See application file for complete search history.

(56) References Cited

U.S. PATENT DOCUMENTS

| | | | | |
|---|---|---|---|---|
| 5,225,712 A | * | 7/1993 | Erdman | 290/44 |
| 5,604,420 A | * | 2/1997 | Nambu | 322/19 |
| 8,278,855 B2 | * | 10/2012 | Kitanaka | 318/400.22 |
| 2006/0012344 A1 | * | 1/2006 | Velhner et al. | 322/23 |
| 2006/0028025 A1 | | 2/2006 | Kikuchi et al. | |

(Continued)

OTHER PUBLICATIONS

Danish First Technical Examination of PA200901044 dated Apr. 12, 2010.

(Continued)

*Primary Examiner* — Tulsidas C Patel
*Assistant Examiner* — Viet Nguyen
(74) *Attorney, Agent, or Firm* — Patterson & Sheridan, LLP

(57) ABSTRACT

A method of controlling a wind turbine generator is provided, the wind turbine generator converting mechanical energy to electrical. The method comprises: determining an electromagnetic power reference representing the electromagnetic power generated by the wind turbine generator, wherein the electromagnetic power reference is determined based on a desired output of the wind turbine generator; controlling the electrical power generated by the wind turbine generator using a control signal, wherein the control signal is derived from the electromagnetic power reference and is modified in dependence on an inverse power function of the wind turbine generator by incorporating minimal copper loss constraint and stator voltage limiting constraint such that non-linearity of the wind turbine generator plant is compensated in the control loop and it operates at its maximum efficiency. One effect of the method is that classical linear control loop design can be employed in spite of the plant being a non-linear identity.

20 Claims, 7 Drawing Sheets

(56) References Cited

U.S. PATENT DOCUMENTS

2007/0035137 A1* 2/2007 Matsukuma et al. ........... 290/52
2008/0296898 A1* 12/2008 Ichinose et al. ................ 290/44
2011/0248565 A1* 10/2011 Helle et al. ..................... 307/31
2012/0081047 A1* 4/2012 Hisada et al. ............ 318/400.09
2013/0009611 A1* 1/2013 Tripathi et al. ................ 322/23

OTHER PUBLICATIONS

International Search Report and Written Opinion for International Application No. PCT/SG2010/000338 dated Mar. 3, 2011.

Danish Search Report for Danish Patent Application No. PA200901044 dated Apr. 7, 2010.

* cited by examiner

METHOD OF CONTROLLING A WIND TURBINE GENERATOR AND APPARATUS FOR CONTROLLING ELECTRIC POWER GENERATED BY A WIND TURBINE GENERATOR

TECHNICAL FIELD

The present invention relates generally to a method of controlling a wind turbine generator as well as an apparatus for controlling electric power or torque generated by a wind turbine generator.

BACKGROUND

In recent years, interior permanent magnet (IPM) wind turbine generators have become more and more subject of intensive investigations.

Compared to surface mount permanent magnet (PM) wind turbine generators, a significant advantage of IPM wind turbine generators is that IPM wind turbine generators enable a higher power density. However, an interior permanent magnet (IPM) machine has a salient magnetic rotor. As a result, the electromagnetic power generated by this machine can be categorised into two types. The magnet field power (denoted as FP) is generated by the interaction of magnet field and the stator flux or current perpendicular to it. The reluctance power (denoted as RP) is generated by the interaction of the stator flux or current which aligns with the magnet field and the stator flux or current which is perpendicular to the magnet field. The reluctance power is proportional to the difference of inductance in the 'd' and 'q' axis, i.e. Ld and Lq. On one hand reluctance power enhances power density of the machine but on the other hand, it is a non-linear quantity that makes the IPM machine become non-linear control plant. It is therefore difficult to construct a linear power control system to ensure predictable dynamic response and system stability at all operating conditions.

In steady state operation; it is desired that IPM controller operates at minimal copper loss (MCL) constraint at low speed and operates within voltage limiting (VL) constraint at high speed. With the increase of IPM generator operating speed, the stator voltage is increased accordingly. The generator speed at which field weakening operation starts at high power condition has been termed as the partial field weakening speed. Above partial field weakening speed, the machine side converter voltage has to be limited within the linear PWM modulation range to minimize the stator current harmonics by applying demagnetization current to the generator. In the field weakening operation, the machine side converter works at closer to unity PWM modulation index value. Moreover, parameter variation due to saturation and temperature change may cause significant deterioration of IPM steady state performance.

Intensive research effort in IPM control has been devoted on achieving MCL control at low speed and VL based field weakening control at high speed to improve the steady state operation efficiency. Most of the published control solutions have not considered the IPM non-linearity. For this type of control system, the controller dynamic performance is unpredictable. The stability margin of IPM control system can not be ensured and the dynamic performance of the IPM machine highly depends on the operation conditions. The steady state performance may deteriorate with generator saturation and temperature changes. Literature suggests the use of 2-dimensional curve fitting approaches. Switching between the 2-dimensional look-up tables or polynomial functions is decided by the operation speed which leads to sudden change of the current reference signals. This results in stability issues in power control system.

The objective of the present invention is to provide a solution to mitigate above-mentioned problems.

SUMMARY

According to an embodiment of the present invention, a method to linearize the IPM power control system is provided which adds a non-linear compensation unit in the power control loop inversing the IPM non-linear power equation and cancelling the non-linearity of IPM power generation.

Two approaches are described to implement the IPM linearization power control method. One approach is to implement the method in a flux vector reference based IPM control system that is applicable for stator flux control. Another approach is to implement the method in a current vector reference based IPM generator power control system that is applicable for stator current control.

According to an embodiment of the present invention, the linearized power control is achieved by adding a look-up table curve or polynomial curve based non-linear gain compensation block in the power control loop to generate the field power stator flux or current reference. Two different constraints are applied for linearization of the IPM power control system. Below the partial field weakening speed, the minimal copper loss (MCL) constraint is applied to derive the IPM characteristic equation for MCL look-up table curve or polynomial curve generation. Above partial field weakening speed, the VL constraint is applied to derive the IPM characteristic equation for VL look-up table curves or polynomial curves generation. The look-up table curves or polynomial curves can be generated on-line to account for machine parameter changes.

According to an embodiment of the present invention, in the linearized power control system, the reluctance power (RP) stator flux or current reference is computed analytically by an MCL control unit and a field weakening (FW) control unit using the FP flux or current reference as input signal.

According to an embodiment of the present invention, in steady state operation, the analytical computation determines the relationship of FP flux or current reference and RP flux or current reference. By using the IPM parameters identified on-line in the analytical computation of the MCL control unit and the FW control unit, the IPM parameter variation is taken into account in the power control in steady state operation.

According to an embodiment of the present invention, in the linear power control, a smooth transition of the controller structure between MCL operations to VL field weakening operation is ensured by choosing the MCL constraint based or VL constraint based stator flux or current reference signal of smallest amplitude as the output stator flux or current reference signal for both field power generation and reluctance power generation.

Advantages of embodiments of the present invention are:
a) The linearized power control makes it possible to apply classic linear control theory in power controller design. The resulting power control system is therefore predictable and has the same dynamic response at all operation conditions with desired stability margins.
b) The simplicity of analytical computation of MCL control and VL based field weakening control for reluctance power flux or current reference generation can be retained, so that IPM parameter adaptation within this analytical computation can be easily applied to ensure maximum efficiency of IPM in steady state operation.

c) A smooth transition of the reference signals between MCL control and VL based field weakening operation control can be used to ensure system stability in control structure change.

d) An on-line generation of look-up table curves or polynomial functions used in the non-linearity compensation unit based on the IPM characteristic equation is used to adapt to the IPM parameter changes.

According to an embodiment of the present invention, a method of controlling a wind turbine generator is provided, the wind turbine generator converting mechanical energy to electrical energy, the method comprising:

determining an electromagnetic power reference representing the electromagnetic power generated by the wind turbine generator, wherein the electromagnetic power reference is determined based on a desired output (power or torque) of the wind turbine generator, controlling the electrical power generated by the wind turbine generator using a control signal, wherein the control signal is derived from the electromagnetic power reference and is modified in dependence on an inverse power function of the wind turbine generator such that non-linearity of the wind turbine generator is compensated.

According to an embodiment of the present invention, a first field power stator flux or current reference is determined based on a first criterion in dependence on the electromagnetic power reference; a second field power stator flux or current reference is determined based on a second criterion in dependence on the electromagnetic power reference; one of the first field power stator flux or current reference and the second field power stator flux reference is selected; and a stator flux or current of the wind turbine generator is controlled based on the selected field power stator flux or current reference.

According to an embodiment of the present invention, the first field power stator flux or current reference and the second field power stator flux or current reference are determined such that non-linearity of the wind turbine generator is compensated.

According to an embodiment of the present invention, determining the second field power stator flux or current reference comprises: determining a first preliminary field power stator flux or current reference based on the electromagnetic power reference obtained at the partial field weakening speed of the wind turbine generator; determining a second preliminary field power stator flux or current reference based on the electromagnetic power reference obtained at a maximum speed of the wind turbine generator; determining a weighted average of the first preliminary field power stator flux or current reference and the second preliminary field power stator flux or current reference in order to obtain the second field power stator flux or current reference.

According to an embodiment of the present invention, selecting one of the first field power stator flux or current reference and the second field power stator flux or current reference comprises: comparing an absolute value of the first field power stator flux or current reference and an absolute value of the second field power stator flux or current reference; and selecting the one of the first field power stator flux or current reference and the second field power stator flux or current reference which has the smaller absolute value.

According to an embodiment of the present invention, the method further comprises the following processes: determining a first reluctance power stator flux or current reference based on a third criterion and the selected field power stator flux or current reference; determining a second reluctance power stator flux or current reference based on a fourth criterion and on the selected field power stator flux or current reference; selecting one of the first reluctance power stator flux or current reference and the second reluctance power stator flux or current reference; and controlling the stator flux or current of the wind turbine generator based on the selected field power stator flux or current reference and the selected reluctance power stator flux or current reference.

According to an embodiment of the present invention, selecting one of the first reluctance power stator flux or current reference and the second reluctance power stator flux or current reference comprises: comparing an absolute value of the first reluctance power stator flux or current reference and an absolute value of the second reluctance power stator flux or current reference; and selecting the one of the first reluctance power stator flux or current reference and the second reluctance power stator flux or current reference which has the smaller absolute value.

According to an embodiment of the present invention, the computation of the first reluctance power stator flux or current reference and the second reluctance power stator flux or current reference are carried out analytically.

According to an embodiment of the present invention, the first field power stator flux or current reference and the second field power stator flux or current reference are determined using look-up tables or polynomial functions.

According to an embodiment of the present invention, the first criterion is the solution of minimal copper loss constraint and IPM power equation.

According to an embodiment of the present invention, the second criterion is the solution of voltage limiting constraint and IPM power equation.

According to an embodiment of the present invention, the wind turbine generator is a wind turbine generator having a reluctance power component, for example an Interior Permanent Magnet generator.

According to an embodiment of the present invention, an apparatus for controlling electrical power or torque generated by a wind turbine generator is provided, the apparatus comprising: a linear power controller to generate an electromagnetic power reference, wherein the electromagnetic power reference represents the electromagnetic power generated by the wind turbine generator and is determined based on a desired output of the wind turbine generator; a controlling unit adapted to control the electrical power generated by the wind turbine generator using a control signal, wherein the control signal is derived from the electromagnetic power reference and is modified in dependence on an inverse power function of the wind turbine generator such that non-linearity of the wind turbine generator is compensated.

According to an embodiment of the present invention, the controlling unit comprises a linear control sub-unit and a linearization sub-unit coupled to the linear control sub-unit, wherein the control signal is routed from a linear control unit through the linearization sub-unit and then fed into the linear control sub-system, wherein the linearization unit is adapted to linearize the non-linearity of the wind turbine generator.

According to an embodiment of the present invention, the controlling unit comprises: a first determining sub-unit adapted to determine a first field power stator flux or current reference based on a first criterion in dependence on the electromagnetic power reference; a second determining sub-unit adapted to determine a second field power stator flux or current reference based on a second criterion in dependence on the electromagnetic power reference; a selection subunit adapted to select one of the first field power stator flux or current reference and the second field power stator flux reference; and a controlling subunit adapted to control a stator flux or current of the wind turbine generator based on the selected field power stator flux or current reference.

According to an embodiment of the present invention, the first determining subunit and the second determining subunit are adapted to determine the first field power stator flux or current reference and the second field power stator flux or current reference such that non-linear elements of the electrical power generated are compensated.

According to an embodiment of the present invention, the second determining subunit is adapted to determine the second field power stator flux or current based on the following processes: determining a first preliminary field power stator flux or current reference based on the electromagnetic power reference obtained at a partial field weakening speed; determining a second preliminary field power stator flux or current reference based on the electromagnetic power reference obtained at a maximum speed; determining a weighted average of the first preliminary field power stator flux or current reference and the second preliminary field power stator flux or current reference in order to obtain the second field power stator flux or current reference.

According to an embodiment of the present invention, the selection subunit is adapted to select one of the first field power stator flux or current reference and the second field power stator flux or current reference based on the following processes: comparing an amplitude of the first field power stator flux or current reference and an amplitude of the second field power stator flux or current reference; and selecting the one of the first field power stator flux or current reference and the second field power stator flux or current reference which has the smaller absolute value.

According to an embodiment of the present invention, the apparatus further comprises: a third determining subunit adapted to determine a first reluctance power stator flux or current reference based on a third criterion and the selected field power stator flux or current reference; a fourth determining subunit adapted to determine a second reluctance power stator flux or current reference based on a fourth criterion and on the selected field power stator flux or current reference; a selection subunit adapted to select one of the first reluctance power stator flux or current reference and the second reluctance power stator flux or current reference; and a controlling subunit adapted to control the stator flux of the generator based on the selected field power stator flux or current reference and the selected reluctance power stator flux or current reference.

According to an embodiment of the present invention, the third criterion is the generator minimal copper loss constraint.

According to an embodiment of the present invention, the fourth criterion is the generator voltage limiting constraint.

According to an embodiment of the present invention, the selection subunit is adapted to carry out the following processes: comparing an amplitude of the first reluctance power stator flux or current reference and an amplitude of the second reluctance power stator flux or current reference; and selecting the one of the first reluctance power stator flux or current reference and the second reluctance power stator flux or current reference which has the smaller amplitude.

According to an embodiment of the present invention, the third determining subunit and the fourth determining subunit are adapted to calculate the first reluctance power stator flux or current reference and the second reluctance power stator flux or current reference analytically, respectively.

According to an embodiment of the present invention, the third determining subunit and the fourth determining subunit are adapted such that IPM machine parameters used in the analytical computation formulas for determining the first reluctance power stator flux or current reference and the second reluctance power stator flux or current reference are modified during the process of controlling the electrical power or torque in dependence on the present state of the wind turbine generator.

According to an embodiment of the present invention, the first determining subunit and the second determining subunit are adapted such that the first field power stator flux or current reference and the second field power stator flux or current reference are calculated using look-up tables or polynomial equations.

According to an embodiment of the present invention, the wind turbine generator is an interior permanent magnet generator.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Exemplary embodiments of a wind turbine rotor blade, a wind turbine and a method of control the wind turbine generator in accordance with the present invention will be described in detail below with reference to the accompanying figures. The exemplary embodiments described below can be modified in various aspects without changing the essence of the invention.

Figure 1:
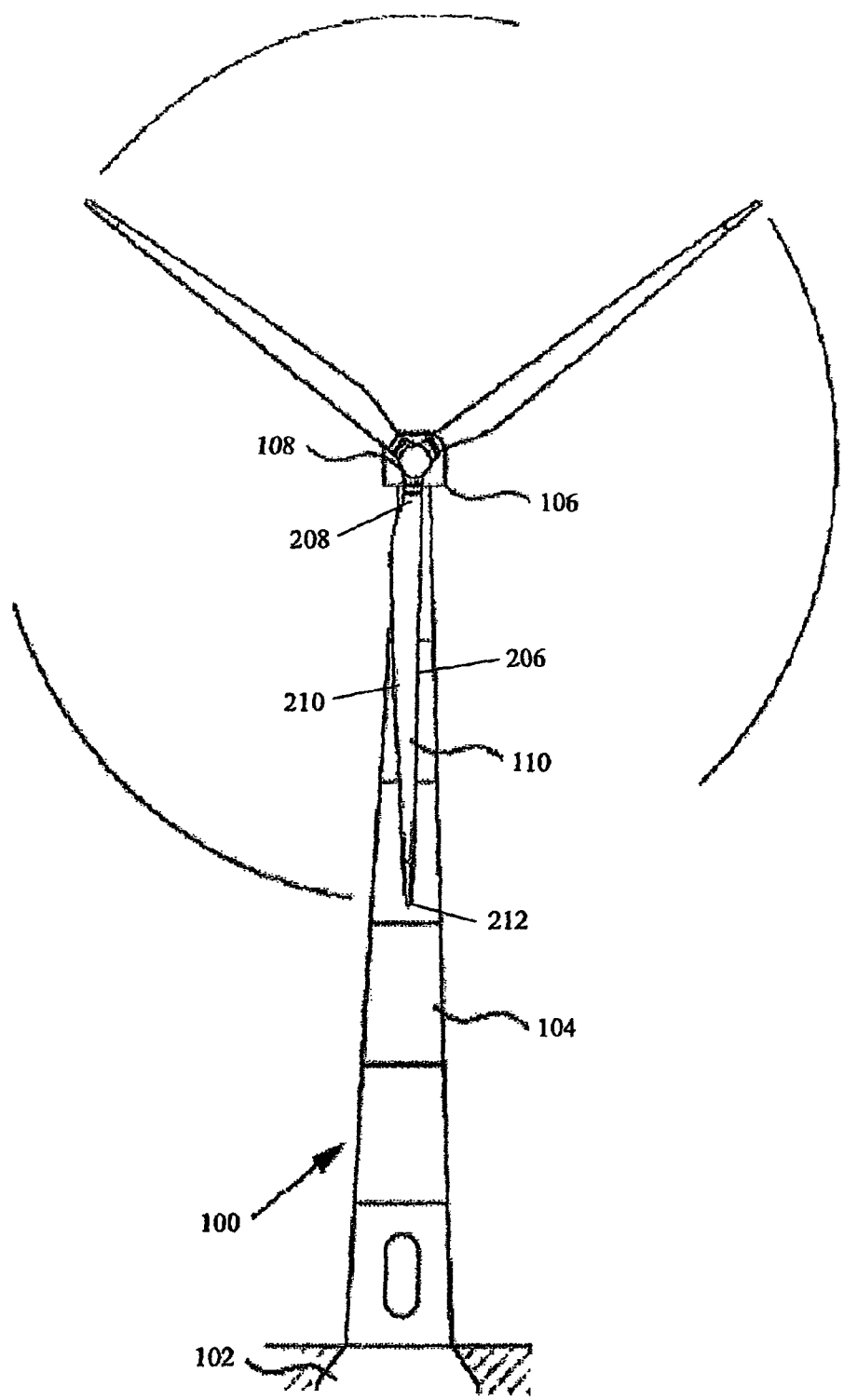
FIG. 1 illustrates a common setup of a conventional wind turbine.

FIG. 1 illustrates a common setup of a conventional wind turbine 100. The wind turbine 100 is mounted on a base 102. The wind turbine 100 includes a tower 104 having a number of tower sections, such as tower rings. A wind turbine nacelle 106 is placed on top of the tower 104. The wind turbine rotor includes a hub 108 and at least one rotor blade 110, e.g. three rotor blades 110. The rotor blades 110 are connected to the hub 108 which in turn is connected to the nacelle 106 through a low speed shaft which extends out of the front of the nacelle 106.

Figure 2:
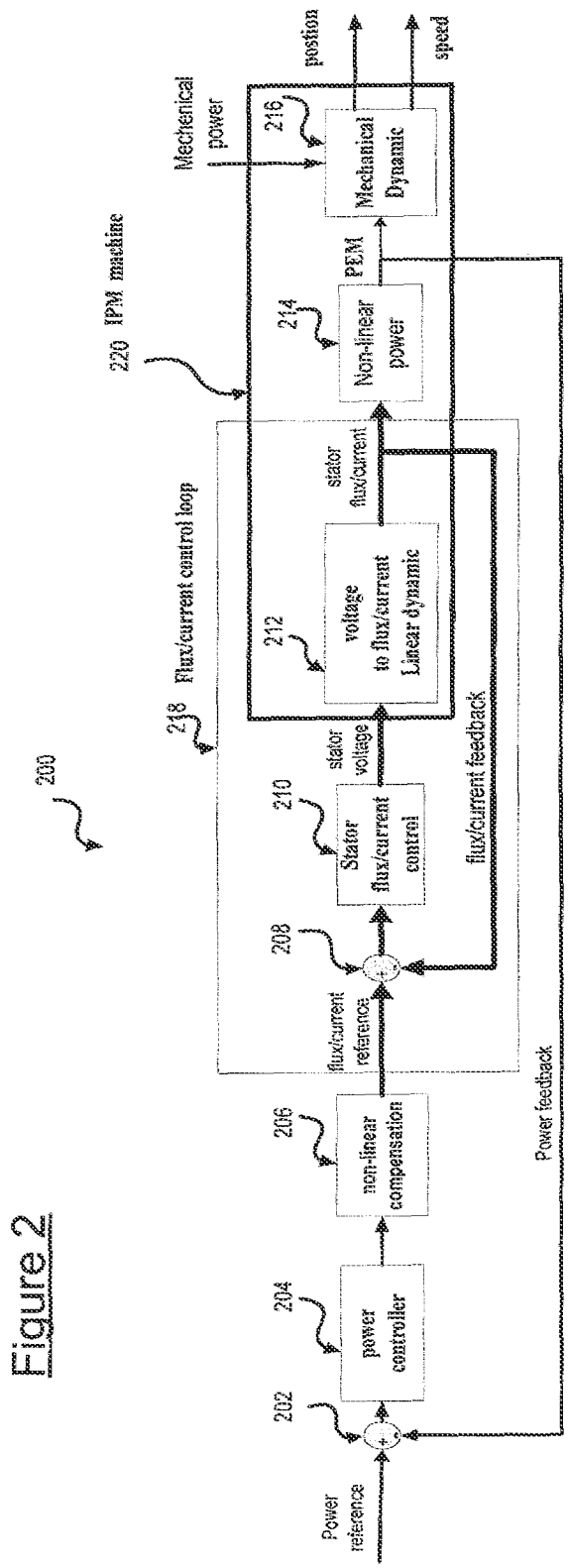
FIG. 2 shows a schematic block diagram illustrating the working principle of linearized power control of a wind turbine generator according to an embodiment of the present invention.

FIG. 2 shows a power control system 200 for an IPM wind turbine generator 220 according to an embodiment of the present invention. In FIG. 2, the electrical dynamic system of IPM machine 220 is schematically represented in three functional units, namely a linear electrical dynamic response unit 212 with stator voltage signal as input and stator flux or current vector signals as output, a non-linear electrical dynamic response unit 214 with stator flux or current vector signals as input and electromagnetic power as output, and a mechanical dynamic response of wind turbine generator unit 216 with generator electromagnetic power and the mechanical power obtained from the generator shaft as input and generator speed and generator rotor position signals as output.

In the rotor flux synchronous reference frame, IPM electrical linear dynamic unit 212 with stator voltage as input and stator flux vector as output can be represented as:

$$u_{RP} = R_s * (\psi_{RP} - \psi_r)/L_d - \omega_r * \psi_{FP} + \frac{d\psi_{RP}}{dt}$$

$$u_{FP} = R_s * \psi_{FP}/L_q + \omega_r * \psi_{RP} + \frac{d\psi_{FP}}{dt}$$

In these equations, variables "u" and "ψ" denote voltage and flux signal respectively; the footnote "r" denotes that the variable is associated with the rotor, the footnote RP denotes that the variable is associated with reluctance power, footnote FP denotes the variable is associated with field power; and $\omega_r$ denotes the generator electrical speed; "Ld" and "Lq" denotes the d-axis inductance and q-axis inductance respectively. Rs denotes the stator resistance.

The IPM generator electrical linear dynamic response unit 212 with stator voltage as input and stator current vector as output can be represented as:

$$u_{RP} = R_s * i_{RP} + L_d \frac{di_{RP}}{dt} - L_q * \omega_r * i_{FP}$$

$$u_{FP} = R_s * i_{FP} + L_q \frac{di_{FP}}{dt} + L_d * \omega_r * i_{RP} + \omega_r * \psi_r$$

In these equations, variable "i" denotes the current signal.

The IPM generator non-linear electrical response unit 214 with stator flux vector as input and generator electromagnetic power PEM as output can be represented as:

$$PEM = \omega_r * \frac{3}{2}\left(\frac{1}{L_q} * \psi_r + \frac{(L_d - L_q)}{L_d * L_q} * (\psi_{RP} - \psi_r)\right) * \psi_{FP}$$

The IPM generator non-linear electrical response unit 214 with stator current vector as input and generator electromagnetic power PEM as output can be represented as:

$$PEM = \omega_r * 3/2(\psi_r i_{FP} + (L_d - L_q) * i_{RP} * i_{FP})$$

The mechanical dynamic response of wind turbine generator unit 216 can be represented as:

$$P_{mech}/\omega_m = PEM/\omega_m + J * \frac{d\omega_m}{dt} + K * \omega_m$$

$$\omega_m = \frac{d\theta_m}{dt}$$

Where, $\theta_m = \theta_r/PP$ and $\omega_m = \omega_r/PP$ are the generator mechanical position and mechanical speed respectively, PP is generator pole pairs, $P_{mech}$ is the mechanical power obtained from generator shaft, and J and K are the inertia and viscous coefficient of wind turbine generator system, respectively.

The IPM generator power control system 200 includes a generator power error computation unit 202, a power controller unit 204 which is normally implemented as a proportional-integral (PI) controller, a non-linear compensation unit 206, the stator flux or current control feedback linear control loop 218, and the IPM machine non-linear power response unit 214.

The stator flux or current control feedback linear control loop 218 is composed of a stator flux or current vector error computation unit 208, a stator flux or current controller unit 210, and the IPM machine linear electrical dynamic response unit 212. Normally, proportional-integral (PI) controllers are used in unit 210 for stator flux or current vector control.

In operation, the power feedback signal is subtracted from the power reference signal at the unit 202. The output of the unit 202 is the difference between the power reference signal and the power feedback signal. Based on the output signal of the subtracting unit 202, the power control unit 204 generates and outputs a control signal based on which the power generated by the IPM wind turbine generator 220 is controlled to match the power target value (the power reference signal). The control signal output by the power control unit 204 is fed into the non-linear compensation unit 206 which modifies the control signal and generates the stator flux or current vector components such that the non-linear relationship from the stator flux or current vector to electromagnetic power of IPM machine is reversed. Therefore, in the IPM power control system 200, the combined gain of the non-linear compensation unit 206 in the control part of the IPM power control system 200 and of the IPM machine linear electrical dynamic response unit 212 in the IPM generator part of the IPM power control system 200 is close to unity (i.e. combined gain≈1). The control signal after non-linear compensation in 206 is supplied to the flux or current linear feedback control loop unit 214 which controls the stator flux or current vector of the wind turbine generator 220 such that the power generated by the IPM wind turbine generator 220 matches the power target value (the power reference signal).

One effect of this embodiment is that, the non-linear compensation unit 206 linearizes the generator power control system 200 such that both the power control unit 204 and the flux and current feedback control subsystem 218 can be designed using the classic linear control theory.

Figure 3:
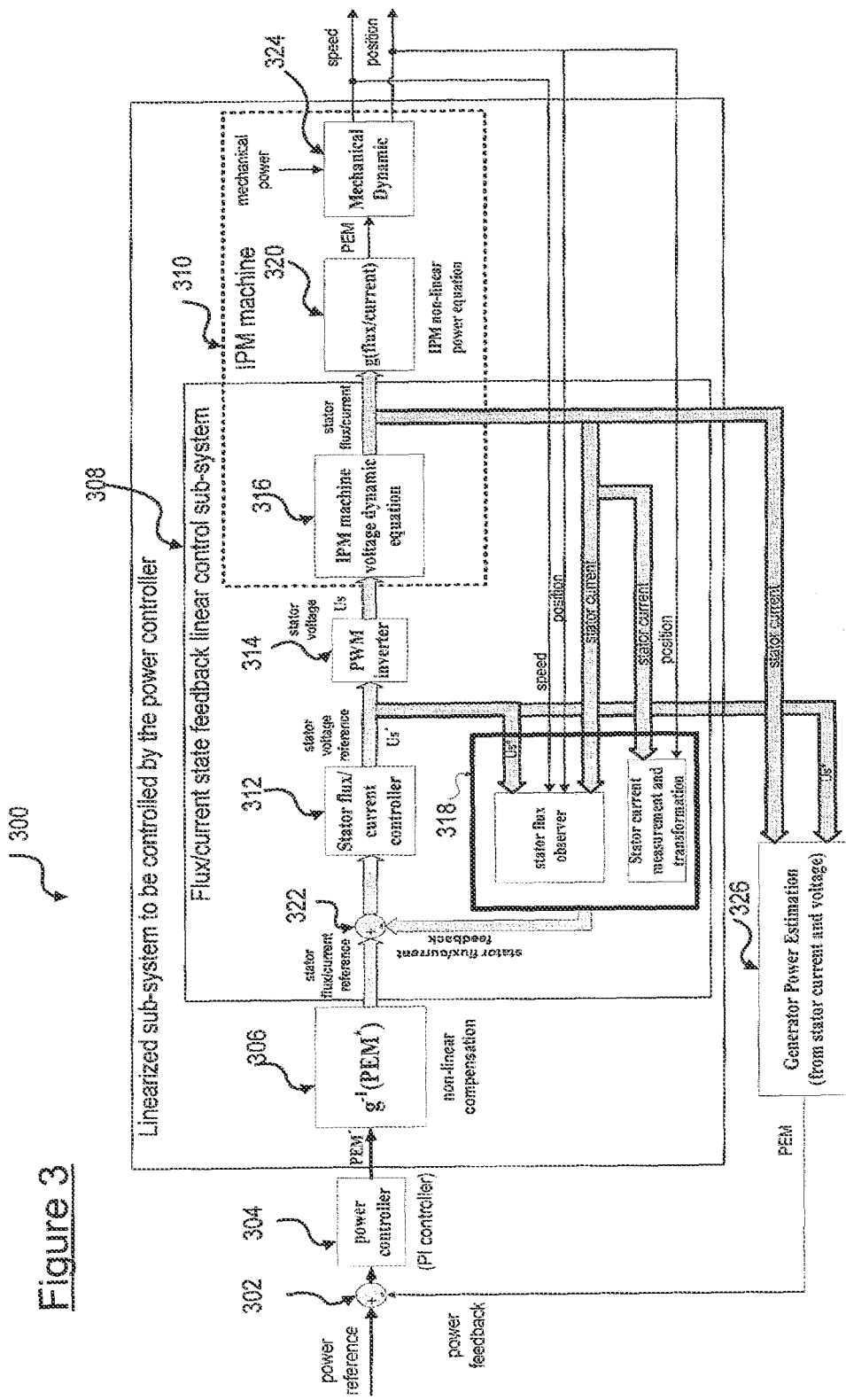
FIG. 3 shows a schematic block diagram illustrating a possible implementation of the linearized power control working principle shown in FIG. 2 according to an embodiment of the present invention.

FIG. 3 shows a more detailed linearized power control system 300 for controlling electrical power or torque of an IPM wind turbine generator 310 according to an embodiment of the present invention.

In power control system 300, the power feedback signal is generated in generator power estimation unit 326 based on the stator current measurement and stator voltage reference. The formula for IPM electromagnetic power estimation in generator power estimation unit 326 can be represented in stator stationary α/β reference frame as:

$$PEM = (3/2)*(I_{S\alpha}*U^*_{s\alpha} + I_{S\beta}*U^*_{s\beta})$$

In the case of using the stator current control approach to embody the power control system 300, the stator current vector is directly obtained by measurement in unit 318 and is transferred to the corresponding reference frame for current control purpose.

In the case of using the stator flux vector approach to embody the power control system 300, the stator flux feedback vector signals are generated in unit 318 using a conventional stator flux observation method. The input signals supplied to a corresponding stator flux observer include the stator voltage reference, the stator current from measurement, and the generator position and speed estimated from a shaft mounted encoder measurement. Both current mode stator flux observer and voltage mode stator flux observer are used for stator flux observation. Current mode observer is used at low speed. Voltage mode observer is used at high speed.

The IPM current mode stator flux observer implemented in unit 318 can be represented in stator stationary α/β reference frame as ("CM denotes current mode"):

$$\psi_{s\alpha\_CM} = -(L_d * \sin^2(\theta_r) + L_q * \cos^2(\theta_r)) * i_{s\alpha} +$$
$$\left(\frac{\sin(2*\theta_r)*(L_d - L_q)}{2}\right) * i_{s\beta} + \psi_{rm} * \sin(\theta_r)$$
$$\psi_{s\beta\_CM} = \left(\frac{\sin(2*\theta_r)*(L_d - L_q)}{2}\right) * i_{s\alpha} -$$
$$(L_q * \sin^2(\theta_r) + L_d * \cos^2(\theta_r)) * i_{s\beta} - \psi_{rm} * s\cos(\theta_r)$$

The IPM voltage mode stator flux observer implemented in unit 318 can be represented in stator stationary α/β reference frame as ("VM denotes voltage mode"):

$$\psi_{s\alpha\_VM} = \int(U_{s\alpha} - i_{s\alpha} * Rs) dt$$

$$\psi_{s\beta\_VM} = \int(U_{s\beta} - i_{s\beta} * Rs) dt$$

The power control system 300 includes a subtracting unit 302, a power controller unit 304, a non-linear compensation unit 306, and a flux or current control loop unit 308, the IPM non-linear electrical response unit 320, the IPM generator mechanical dynamic system 324, and the generator power estimation unit 326 which generates the power feedback signal.

The stator flux or current control loop unit 308 comprises the flux or current vector error signal computation unit 322, a stator flux or current vector controller unit 312, a pulse width modulation (PWM) inverter unit 314, an IPM machine voltage to stator flux or current linear electrical dynamic response unit 316, a stator current measurement or stator flux observation unit 318.

The power feedback signal PEM reflects the power currently generated by the IPM wind turbine generator 310. The power feedback signal PEM is received by the subtracting unit 302 and is subtracted from the power reference signal which represents the target power which should be generated by the IPM wind turbine generator 310. The output of the subtracting unit 302 reflects the difference between the power reference signal and the power feedback signal. Based on the output signal of the subtracting unit 302, the power controller unit 304 generates a generator power reference control signal PEM* so that the power generated by the IPM wind turbine generator 310 is controlled to match the power target value (the power reference signal).

The control signal PEM* output by the power controller 304 is fed into the non-linear compensation unit 306 (concrete embodiments of the non-linear compensation unit 306 are for example shown in FIG. 4 and FIG. 5 and will be discussed later) which modifies the control signal such that the non-linearity of the IPM generator are compensated. As a result, the non-linear compensation unit 306 outputs the stator flux or current vector reference signals and supplies them to a subtracting unit 322. At the unit 322, the stator flux or current state feedback vector signals which are obtained from the stator current measurement or stator flux observation unit 318 are subtracted from the stator flux or current reference vector signals. The stator flux or current vector error signals output by the subtracting unit 322 are supplied to the stator flux or current controller unit 312 which generates the stator voltage reference vector signals Us* which are supplied to the pulse width modulation (PWM) inverter unit 314. The PWM inverter unit 314 outputs the PWM modulated stator voltage signal Us which is applied to the IPM machine phase terminals. Inside the IPM machine, the stator flux or current vector signals are generated according to the IPM voltage dynamic equation in unit 316 representing the response of the IPM machine to the modulated stator voltage signal Us applied. The stator flux or current vector signals of IPM machine are input into the non-linear power equation in unit 320 representing the response of the IPM machine to the stator flux or current vector signals to generate the generator power. The IPM electromagnetic power of IPM generator is estimated in unit 326 and is used as the power feedback signal PEM for power control loop 300. The IPM stator flux or current vector signals are observed in unit 318 which generates the stator flux or current state feedback vector signals for stator flux or current feedback control loop 308.

As has become apparent, due to the non-linear compensation unit 306 so that g(flux/current)*g⁻(PEM)=1 (Inversion of the IPM machine non-linear gain), the power control loop 300 becomes a linear control system.

Figure 4:
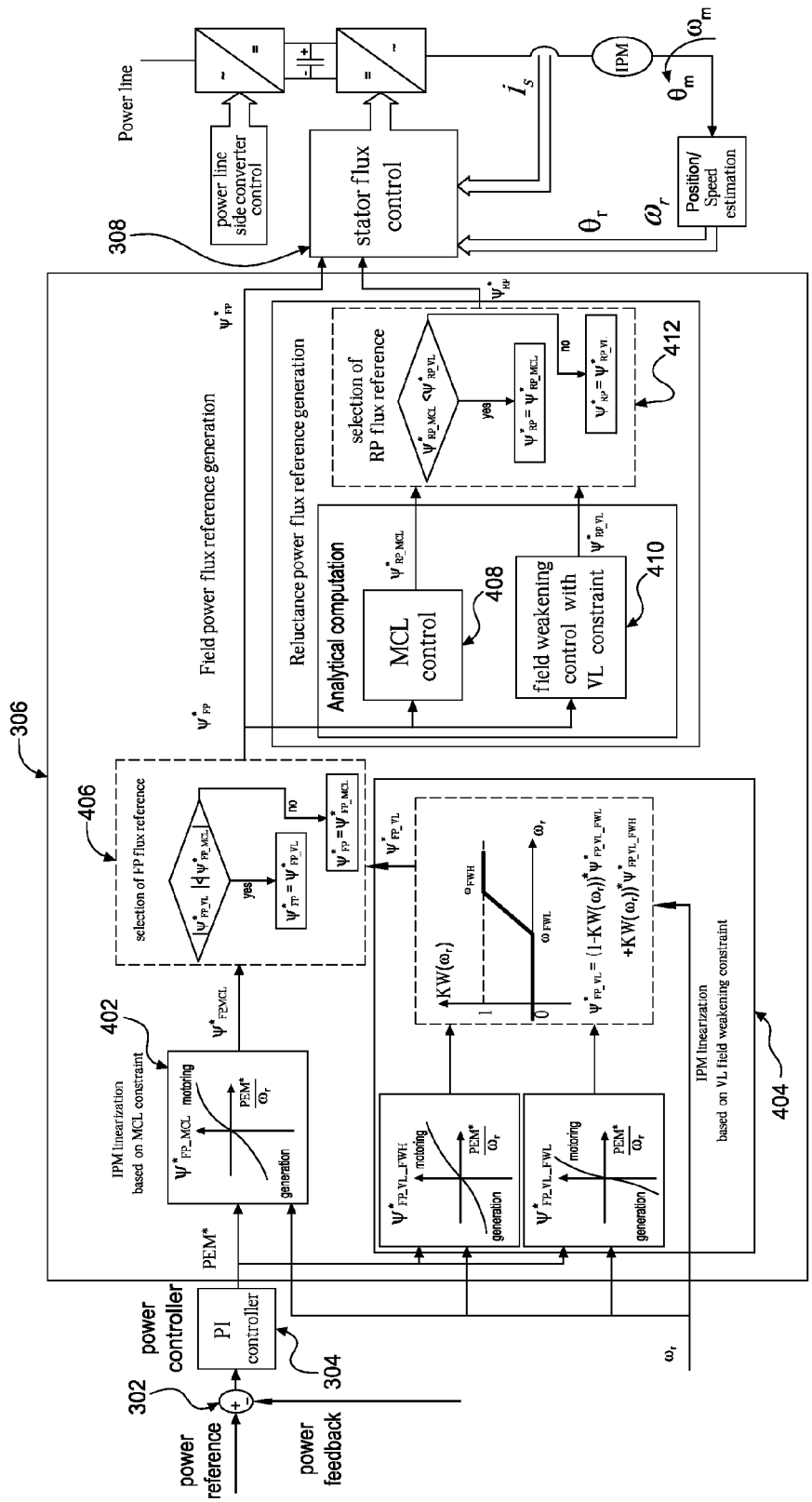
FIG. 4 shows a schematic block diagram illustrating a possible implementation of parts of the linearized power control scheme shown in FIG. 3 based on stator flux control according to an embodiment of the present invention.

FIG. 4 shows a first possible embodiment of the non-linear compensation unit 306 when embodying the working principle of FIG. 3 using the stator flux control approach. In this embodiment, the non-linear compensation unit 306 comprises a first determining sub-unit 402 which is used to determine a first field power flux reference taking the control signal PEM* as its input signal. The non-linear compensation unit 306 further comprises a second determining sub-unit 404 is used to determine a second field power flux reference taking control signal PEM* as its input signal.

The stator flux equation that satisfies the minimal copper loss constraint (MCL constraint) is given by:

$$\psi_{RF} = \frac{2L_q - L_d}{2(L_q - L_d)}\psi_r - L_d * \sqrt{\frac{\psi_r^2}{4(L_q - L_d)^2} + \left(\frac{\psi_{FP}}{L_q}\right)^2}$$

The solution of field power (FP) stator flux that satisfies both the IPM generator power equation and the MCL constraint is derived as the following MCL based IPM characteristic function:

$$16*(L_q)^4*\left(\frac{PEM^*}{\omega_r}\right)^2 - 12*P*(L_q)^3*\psi_r*\psi_{FP\_MCL}^**\left(\frac{PEM^*}{\omega_r}\right) -$$
$$9*P^2*(L_d - L_q)^2*(\psi_{FP\_MCL}^*)^4 = 0$$

For a given speed, the above MCL based IPM characteristic function is a quadratic function of power/speed for a given FP stator flux value. Therefore, basing on the MCL based IPM characteristic function, we can build a look-up table of power/speed vs. FP stator flux data pairs using the solution of the above quadratic function:

$$\frac{PEM}{\omega_r} = \frac{12*P*(L_q)^3*\psi_r*\psi_{FP} - \sqrt{\begin{array}{c}(-12*P*(L_q)^3*\psi_r*\psi_{FP})^2 + \\ 4*16*(L_q)^4*9* \\ P^2*(L_d-L_q)^2*(\psi_{FP})^4)\end{array}}}{2*16*(L_q)^4}$$

To improve the computation efficiency of the first determining sub-unit 402 for IPM non-linearity compensation, a second order (or third order) polynomial curve fitting of the above look-up table values is applied by taking the field power stator flux as the output signal and power/speed as the input signal. Using second order polynomial curve fitting as an example, the coefficients of the MCL linearization polynomial function is thus obtained and used as the function in the first determining sub-unit 402 to determine the first field power flux reference based on the following equation:

$$\psi^*_{FP\_MCL} = a_{MCL}*(PEM^*/\omega_r)^2 + b_{MCL}*(PEM^*/\omega_r)$$

Where $a_{MCL}$ and $b_{MCL}$ are polynomial coefficients.

When IPM works in field weakening operation mode, the VL based linearization equations are applied as implemented in the second determining subunit 404. The stator flux equation that satisfies the voltage limiting (VL) constraint is given by following equation:

$$\psi_{RP} = \sqrt{\left(\frac{U_{dc}}{\sqrt{3}*\omega_r}\right)^2 - (\psi_{FP})^2}$$

The VL based IPM characteristic equation that satisfies both the IPM power equation and voltage limiting constraint is derived as:

$$16*L_d^2*L_q^2*\left(\frac{PEM}{\omega_r}\right)^2 -$$
$$24*P*L_d*L_q^2*\psi_r*\psi_{FP}*\left(\frac{PEM}{\omega_r}\right) + 9*P^2*(L_d-L_q)^2*(\psi_{FP})^4 -$$
$$3*P^2*(L_d-L_q)^2*\frac{U_{dc}^2}{\omega_r^2}*(\psi_{FP})^2 + 9*P^2*L_q^2*\psi_r^2*(\psi_{FP})^2 = 0$$

The above VL based IPM characteristic equation can be rewritten as:

$$a_{VL\_org}*\left(\frac{PEM}{\omega_r}\right)^2 + b_{VL\_org}*\frac{PEM}{\omega_r} + c_{VL\_org} = 0$$

Where, $$a_{VL\_org} = 16*L_d^2*L_q^2$$

$$b_{VL\_org} = -24*(2*PP)*L_d*L_q^2*\psi_r*\psi_{FP}$$

$$c_{VL\_org} = 9*(2*PP)^2*(L_d-L_q)^2*\psi_{FP}^4 -$$
$$3*(2*PP)^2*(L_d-L_q)^2*\frac{U_{dc}^2}{\omega_r^2}*\psi_{FP}^2 + 9*P^2*L_q^2*\psi_r^2*\psi_{FP}^2$$

At partial field weakening speed $\omega_r = \omega_{FWL}$ (where, footnote "FWL" denotes low speed boundary for field weakening operation), a set of look-up table data values can be generated based on the above VL based IPM characteristic equation by providing a set of FP stator flux values as input using the following solution:

$$\frac{PEM}{\omega_{FWL}} = \frac{-b_{VL\_org} + \sqrt{b_{VL\_org}^2 - 4*a_{VL\_org}*c_{VL\_org}(\omega_{FWL})}}{2*a_{VL\_org}}$$

Similarly, at maximum speed $\omega_r = \omega_{FWL}$, a set of look-up table data values can be generated based on the above VL based IPM characteristic equation by providing a set of field power stator flux values as input by applying the following solution:

$$\frac{PEM}{\omega_{FWH}} = \frac{-b_{VL\_org} + \sqrt{b_{VL\_org}^2 - 4*a_{VL\_org}*c_{VL\_org}(\omega_{FWH})}}{2*a_{VL\_org}}$$

For computation efficiency, polynomial curve fitting is applied for look-up table data values of the VL curves at both the partial field weakening speed $\omega_r = \omega_{FWL}$ and the maximum speed $\omega_r = \omega_{FWH}$ (where, footnote "FWH" denotes maximum high speed boundary for field weakening operation).

When second order polynomial curve fitting is applied, the determining subunit 404 determines the first and second preliminary field power stator flux reference at partial field weakening speed level and maximum speed level respectively based on the following polynomial VL linearization functions:

$$\psi^*_{FP\_VL\_FWL} = a_{FWL}*(PEM^*/\omega_r)^2 + b_{FWL}*(PEM^*/\omega_r) \quad (1)$$

$$\psi^*_{FP\_VL\_FWH} = a_{FWH}*(PEM^*/\omega_r)^2 + b_{FWH}*(PEM^*/\omega_r) \quad (2)$$

Where $a_{FWL}$, $b_{FWL}$, $a_{FWH}$ and $b_{FWH}$ are polynomial coefficients.

The results of equations (1) and (2) (first preliminary field power stator flux reference and second preliminary field power stator flux reference) are then used to determine a weighted average of the first preliminary field power stator flux reference and the second preliminary field power stator flux reference to obtain the second field power stator flux reference using the following equation:

$$\psi^*_{FP\_VL} = (1 - KW(\omega_r))*\psi^*_{FP\_VL\_FWL} + KW(\omega_r)*\psi^*_{FP\_VL\_FWH}$$

Where the weight factor $KW(\omega_r)$ is calculated as:

If $\omega_r < \omega_{FWL}$ then $KW(\omega_r)=0$

If $\omega_r > \omega_{FWH}$ then $KW(\omega_r)=1$

If $\omega_{FWL} <= \omega_r <= \omega_{FWH}$ then $$KW(\omega_r) = \frac{\omega_r - \omega_{FWL}}{\omega_{FWH} - \omega_{FWL}}$$

The thus determined second field power stator flux reference and the first field power stator flux reference are then fed into a selection subunit 406. The selection subunit 406 selects one of the first field power stator flux reference and the second field power stator flux reference based on the following equation:

If $|\psi^*_{FP\_MCL}| <= |\psi^*_{FP\_VL}|$ then $\psi^*_{FP} = \psi^*_{FP\_MCL}$ If $|\psi^*_{FP\_MCL}| > |\psi^*_{FP\_VL}|$ then $\psi^*_{FP} = \psi^*_{FP\_VL}$ The thus selected first field power stator flux reference or the second field power stator flux reference is then fed into a third determining subunit 408 and a fourth determining subunit 410. The third determining subunit 408 determines a first reluctance power stator flux reference based on the following equation:

$$\psi^*_{RP\_MCL} = \frac{2L_q - L_d}{2(L_q - L_d)}\psi_r - L_d * \sqrt{\frac{\psi_r^2}{4(L_q - L_d)^2} + \left(\frac{\psi^*_{FP}}{L_q}\right)^2}$$

The fourth determining subunit 410 determines a second reluctance power stator flux reference based on the following equation:

$$\psi^*_{RP\_VL} = \sqrt{\left(\text{Max\_PWM\_modu\_index} * \frac{U_{dc}}{\sqrt{3} * \omega_r}\right)^2 - (\psi^*_{FP})^2}$$

Where, Udc is the DC link voltage signal, and the maximum PWM modulation index (max_PWM_modu_index) is set to closer to and less than unity.

The first reluctance power stator flux reference and the second reluctance power stator flux reference are then supplied to a selection subunit 412 to select one of the first reluctance power stator flux reference and the second reluctance power stator flux reference based on the following equation:

$\psi^*_{RP} = \min(\psi^*_{RP\_MCL}, \psi^*_{RP\_VL})$

The output of the selection units 406 and 412 are then fed to the stator flux controller unit 308 which controls the stator flux (and thus the power or torque generated by the IPM wind turbine generator) in dependence on these stator flux reference signals. The stator flux control unit 308 of FIG. 4 corresponds to the stator flux feedback control loop 308 of FIG. 3. As shown in FIG. 4, the measured stator current, the electrical angular frequency of the rotor of the IPM wind turbine generator as well as the rotor electrical position obtained from shaft mounted encoder are input into the stator flux control unit 308.

Figure 5:
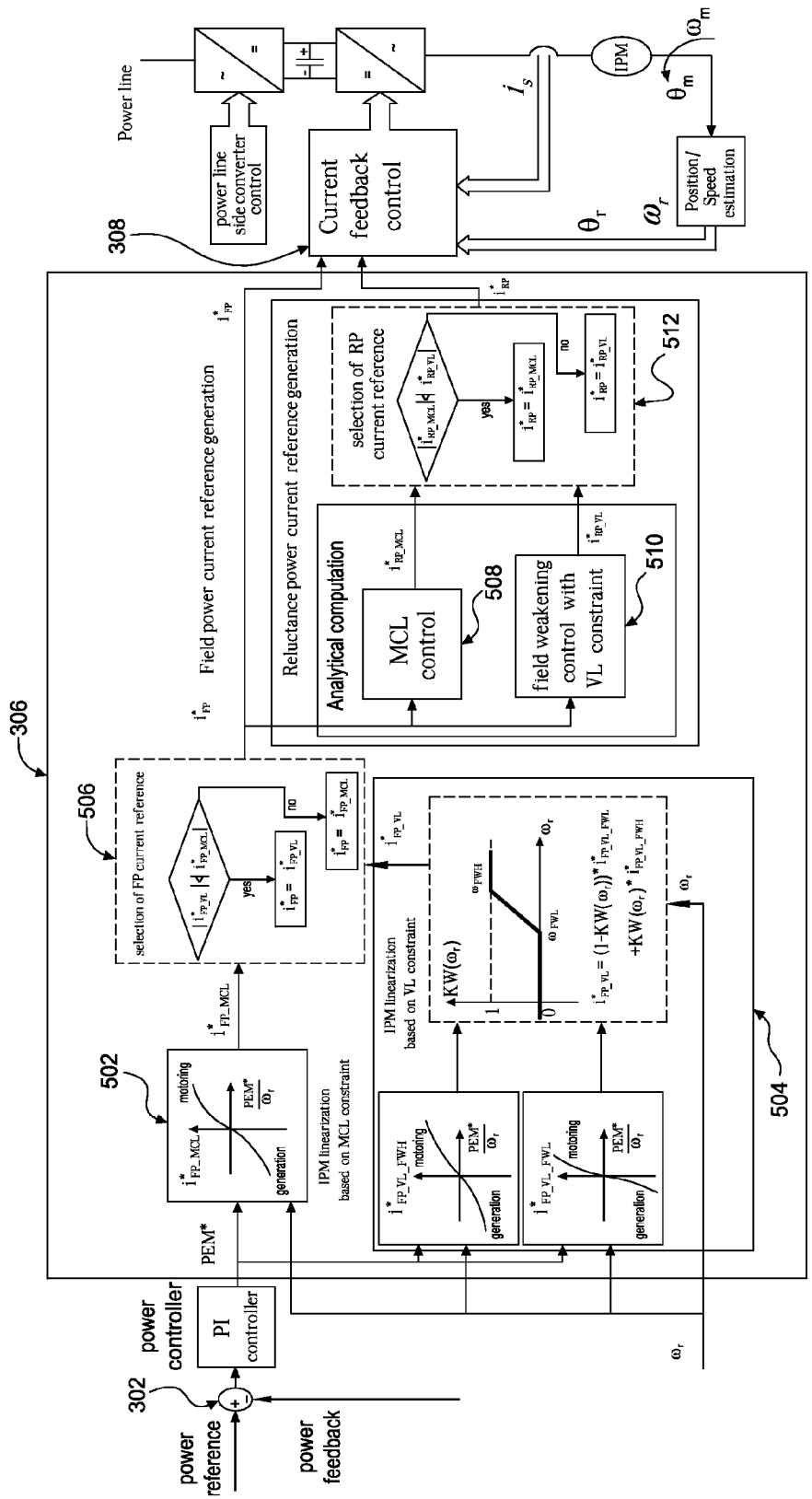
FIG. 5 shows a schematic block diagram illustrating a possible implementation of parts of the linearized power control scheme shown in FIG. 3 based on stator current control according to an embodiment of the present invention.

FIG. 5 shows a second possible embodiment of the non-linear compensation unit 306 of FIG. 3. In this embodiment, the non-linear compensation unit 306 comprises a first determining sub-unit 502 adapted to determine a first field power current reference based on the control signal PEM*. The non-linear compensation unit 306 further comprises a second determining sub-unit 504 adapted to determine a second field power current reference based on the control signal PEM*.

The IPM electromagnetic power PEM with respect to the stator current is represented as:

$PEM = 3/2 * \omega_r * (i_{FP} * \psi_r + (L_d - L_q) * i_{RP} * i_{FP})$

The IPM minimal copper loss constraint (MCL constraint) with respect to the stator current is represented as:

$$i_{RP} = \frac{1}{2(L_q - L_d)}\psi_r - \sqrt{\frac{\psi_r^2}{4(L_q - L_d)^2} + (i_{FP})^2}$$

The IPM voltage limiting constraint (VL constraint) with respect to the stator current is represented as:

$$i_{RF} = -\frac{\psi_r}{L_d} + \sqrt{\left(\frac{U_{dc}}{\sqrt{3} * \omega_r * L_d}\right)^2 - \left(\frac{L_q}{L_d}i_{FP}\right)^2}$$

Utilizing the IPM power equation and the MCL constraint equation, the MCL based IPM characteristic equation with respect to stator current is derived as:

$$16 * (L_q)^4 * \left(\frac{PEM}{\omega_r}\right)^2 - 12 * P * (L_q)^4 * \psi_r i_{FP} * \left(\frac{PEM}{\omega_r}\right) - $$
$$9 * P^2 * (L_d - L_q)^2 * (L_q)^4 * (i_{FP})^4 = 0$$

Utilizing the IPM power equation and the VL constraint equation, the VL based IPM characteristic equation with respect to stator current is derived as:

$$16 * L_d^2 * L_q^2 * \left(\frac{PEM}{\omega_r}\right)^2 - $$
$$24 * P * L_d * L_q^3 * \psi_r * i_{FP} * \left(\frac{PEM}{\omega_r}\right) + 9 * P^2 * (L_d - L_q)^2 * L_q^4 * (i_{FP})^4 - $$
$$3 * P^2 * (L_d - L_q)^2 * \frac{Udc^2}{\omega_r^2} * L_q^2 * (i_{FP})^2 + 9 * P^2 * L_q^4 * \psi_r^2 * (i_{FP})^2 = 0$$

Using the similar polynomial curve fitting look-up table data generation method, when operating below partial field weakening speed, the MCL based IPM characteristic equation is used to derive the polynomial equations used in sub-determination unit 502 to linearize the IPM power control system. When operating above partial field weakening speed, the VL based IPM characteristic equation is used to derive the polynomial equations used in sub-determination unit 504 at partial field weakening speed and maximum speed respectively to linearize the IPM power control system.

Using second order polynominal curve fitting function as an example, the first determining sub-unit 502 determines the first field power current reference based on the following equation (MCL linearization polynomial function):

$i^*_{FP\_MCL} = ai_{MCL} * (PEM^*/\omega_r)^2 + bi_{MCL} * (PEM^*/\omega_r)$ where, $ai_{MCL}$ and $bi_{MCL}$ are second order polynomial coefficients.

The second determining subunit 504 determines the first preliminary field power field power current reference based on the following polynomial VL linearization equation:

$$i^*_{FP\_VL\_FWL} = ai_{FWL} * (PEM^*/\omega_r)^2 + bi_{FWL} * (PEM^*/\omega_r) \quad (3)$$

Where, $ai_{FWL}$ and $bi_{FWL}$ are second order polynomial coefficients obtained at the partial field weakening speed level.

The second determining subunit 504 determines the second preliminary field power stator current reference based on the following polynomial VL linearization equation:

$$i^*_{FP\_VL\_FWH} = ai_{FWH} * (PEM/\omega_r)^2 + bi_{FWH} * (PEM/\omega_r) \quad (4)$$

Where, $ai_{FWH}$ and $bi_{FWH}$ are second order polynomial coefficients obtained at the maximum operation speed level.

The results of equations (3) and (4) (first preliminary field power stator current reference and second preliminary field power stator current reference) are then used to determine the second field power stator current reference using a weighted average of the first preliminary field power stator current reference and the second preliminary field power stator current reference using the following equation:

$$i^*_{FP\_VL} = (1 - KW(\omega_r)) * (i^*_{FP\_VL\_FWL}) + KW(\omega_r) * (i^*_{FP\_VL\_FWH})$$

Where the weighting factor $KW(\omega_r)$ is calculated as:

If $\omega_r < \omega_{FWL}$ then $KW(\omega_r) = 0$

If $\omega_r > \omega_{FWH}$ then $KW(\omega_r) = 1$

If $\omega_{FWL} <= \omega_r <= \omega_{FWH}$ then $$KW(\omega_r) = \frac{\omega_r - \omega_{FWL}}{\omega_{FWH} - \omega_{FWL}}$$

The thus determined second field power stator current reference and the first field power stator current reference are then fed into a selection subunit 506. The selection subunit 506 selects one of the first field power stator current reference and the second field power stator current reference based on the following equation:

If $|i^*_{FP\_MCL}| <= |i^*_{FP\_VL}|$ then $i^*_{FP} = i^*_{FP\_MCL}$

If $|i^*_{FP\_MCL}| > |i^*_{FP\_VL}|$ then $i^*_{FP} = i^*_{FP\_VL}$

The thus selected first field power stator current reference or the second field power stator current reference is then fed into a third determining subunit 508 and a fourth determining subunit 510. The third determining subunit 508 determines a first reluctance power stator current reference based on the following equation:

$$i^*_{RP\_MCL} = \frac{1}{2(L_q - L_d)} \psi_r - \sqrt{\frac{\psi_r^2}{4(L_q - L_d)^2} + (i^*_{FP})^2}$$

The fourth determining subunit 510 determines a second reluctance power stator current reference based on the following equation:

$$i^*_{RP\_VL} = -\frac{\psi_r}{L_d} + \sqrt{\left(\max\_PWM\_Modu\_Index * \frac{U_{dc}}{\sqrt{3} * \omega_r * L_d}\right)^2 - \left(\frac{L_q}{L_d} * i^*_{FP}\right)^2}$$

The first reluctance power stator current reference and the second reluctance power stator current reference are then supplied to a selection subunit 512 to select one of the first reluctance power stator current reference and the second reluctance power stator current reference based on the following equation:

If $|i^*_{RP\_MCL}| <= |i^*_{RP\_VL}|$ then $i^*_{RP} = i^*_{RP\_MCL}$

If $|i^*_{RP\_MCL}| > |i^*_{RP\_VL}|$ then $i^*_{RP} = i^*_{RP\_VL}$

The output of the selection units 506 and 512 are then fed to the stator current control unit 308 which corresponds to the stator current control loop of FIG. 3 to control the stator current (and thus the power generated by the IPM wind turbine generator) in dependence on these signals. As shown in FIG. 5, also the electrical angular frequency of the rotor of the IPM wind turbine generator as well as the rotor electrical position from shaft mounted encoder are input into the stator current control unit 308.

Figure 6:
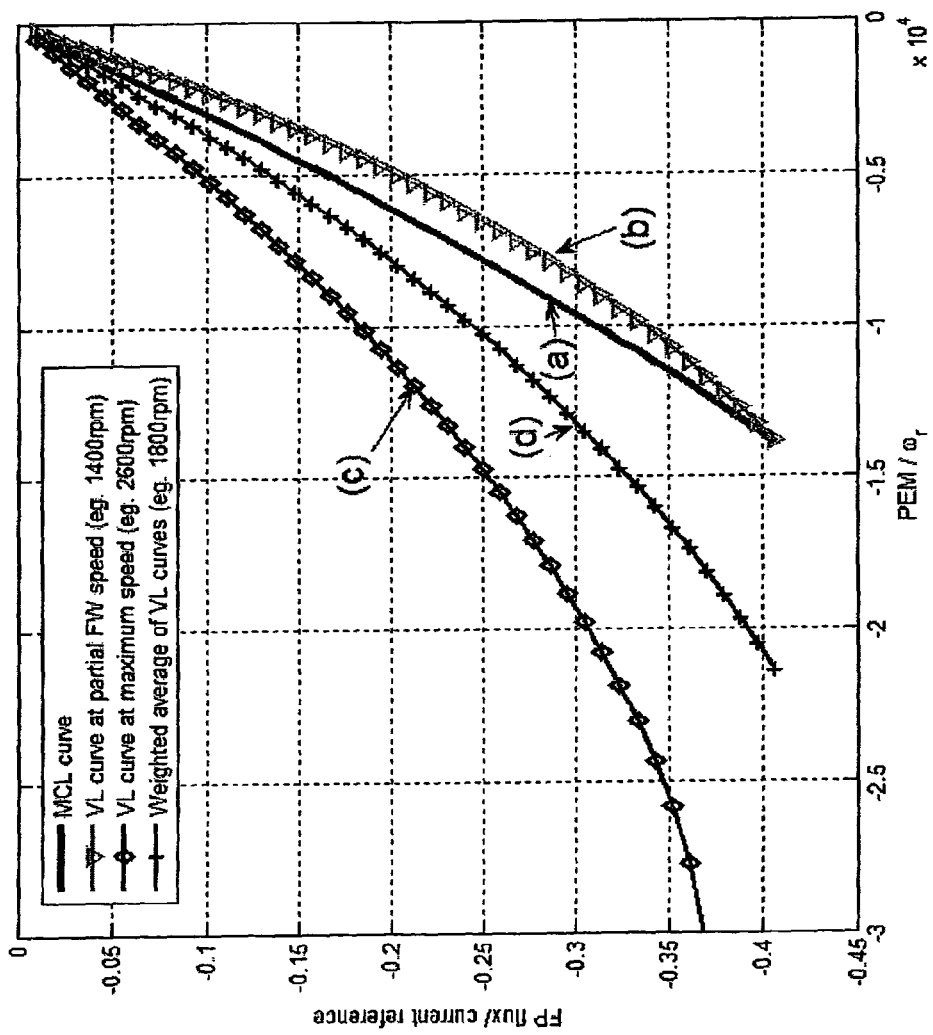
FIG. 6 shows plots of exemplary look-up table curves or polynomial curves used when carrying out the power control linearization method for controlling electrical power according to an embodiment of the present invention.

FIG. 6 illustrates plots of examples of look-up table curves or polynomial curves used when carrying out the method for controlling electrical power according to an embodiment of the present invention. That is, FIG. 6 shows examples of plots of look-up table curves or polynomial curves which are used by the first determining sub-unit 402 of FIG. 4 or unit 502 of FIG. 5 and the second determining sub-unit 404 of FIG. 4 or 504 of FIG. 5 when generating field power stator flux references. In FIG. 6, curve (a) denotes a MCL curve used by the first determining sub-unit 402 or 502 when generating field power stator flux references below partial field weakening speed. Curve (b) denotes a VL curve by the second determining sub-unit 404 or 504 when generating field power stator flux references at partial field weakening speed. Curve (c) denotes a VL curve used by the second determining sub-unit 404 or 504 when generating field power stator flux references at maximum speed. Curve (d) denotes a VL curve generated by weighted average of curve (a) and curve (c) used by the second determining sub-unit 404 or 504 when generating field power stator flux references. All plots of look-up table or polynomial curves (a) to (c) which are shown in FIG. 6 can be generated on-line (i.e. the polynomial functions may be adapted during the operation of the control system to varying parameters of the IPM wind turbine generator).

Figure 7:
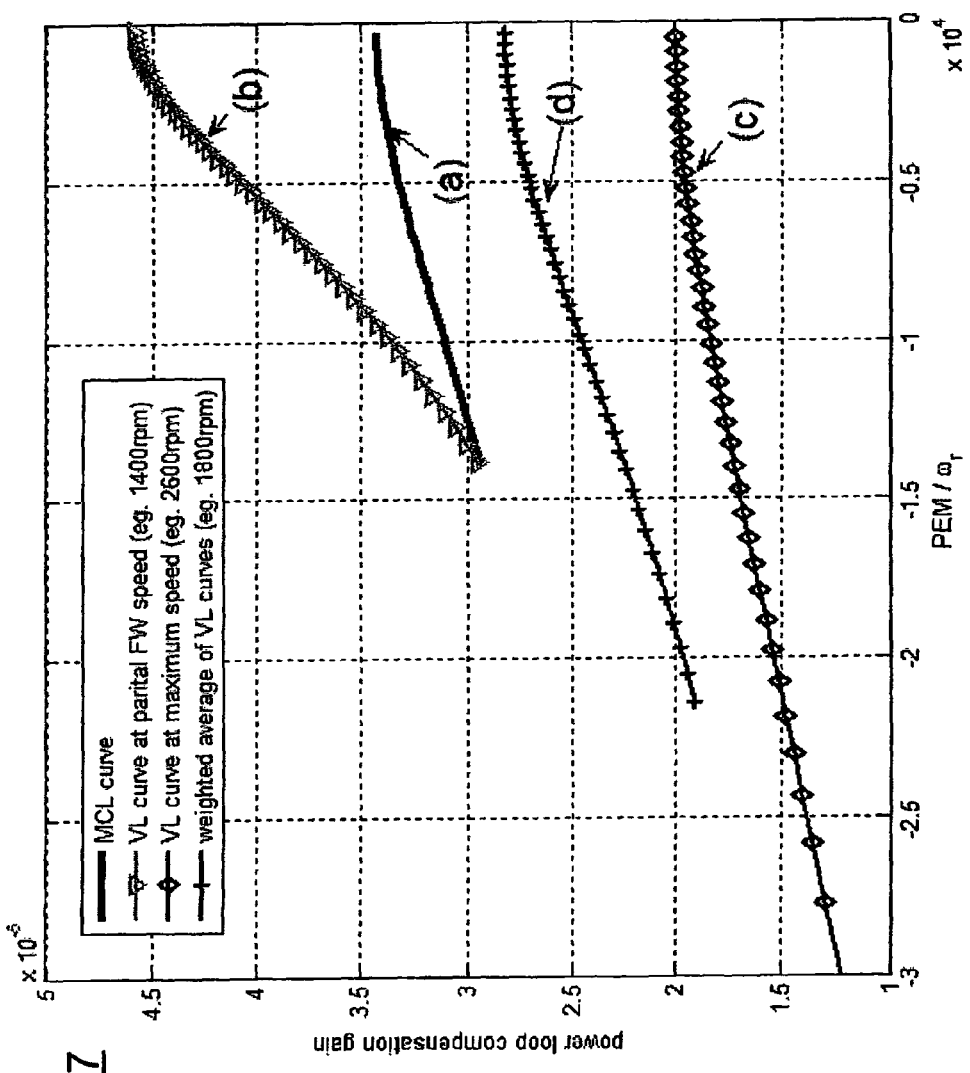
FIG. 7 shows plots of exemplary equivalent power loop compensation gain curves corresponding to the look-up table curves or polynomial curves shown in FIG. 6 when carrying out the method for controlling electrical power according to an embodiment of the present invention.

FIG. 7 shows plots of equivalent power loop compensation gain curves of block 306 which are applied to compensate the non-linearity of the IPM wind turbine generator and which correspond to the look-up table or polynomial curves shown in FIG. 6. That is, curve (a) of FIG. 6 yields compensation gain curve (a) of FIG. 7; curve (b) of FIG. 6 yields compensation gain curve (b) of FIG. 7; curve (c) of FIG. 6 yields compensation gain curve (c) of FIG. 7; and curve (d) of FIG. 6 yields compensation gain curve (d) of FIG. 7. From FIG. 7, it is obvious the non-linear compensation unit 306 effects different compensation gains at different power conditions or different operation speeds.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of controlling a wind turbine generator, the wind turbine generator converting mechanical energy to electrical energy, the method comprising:

determining an electromagnetic power reference representing the electromagnetic power generated by the wind turbine generator, wherein the electromagnetic power reference is determined based on a desired output of the wind turbine generator, controlling the electrical power generated by the wind turbine generator using a control signal, wherein the control signal is derived from the electromagnetic power reference and is modified in dependence on an inverse power function of the wind turbine generator such that non-linearity of the wind turbine generator is compensated;

determining a first field power stator flux or stator current reference based on a first criterion and the electromagnetic power reference;

determining a second field power stator flux or stator current reference based on a second criterion and the electromagnetic power reference;

selecting one of the first field power stator flux or current reference and the second field power stator flux or stator current reference; and controlling a stator flux or current of the wind turbine generator based on the selected field power stator flux or current reference;

wherein determining the second field power stator flux or stator current reference comprises:

determining a first preliminary field power stator flux or stator current reference based on the electromagnetic power reference obtained at a partial field weakening speed (speed at which field weakening operation starts) of the wind turbine generator;

determining a second preliminary field power stator flux or stator current reference based on the electromagnetic power reference obtained at a maximum speed of the wind turbine generator; and determining a weighted average of the first preliminary field power stator flux or stator current reference and the second preliminary field power stator flux or stator current reference in order to obtain the second field power stator flux or stator current reference.

2. The method of claim 1,
wherein the first field power stator flux or stator current reference and the second field power stator flux or stator current reference are determined such that non-linearity of the wind turbine generator is compensated.

3. The method of claim 1,
wherein the first field power stator flux or stator current reference is determined using look-up tables or polynomial functions.

4. The method of claim 1, wherein the first criterion comprises a minimal copper loss constraint.

5. The method of claim 1, wherein the second criterion comprises a voltage limiting constraint.

6. The method of claim 1,
wherein the wind turbine generator is an interior permanent magnet generator.

7. A method of controlling a wind turbine generator, the wind turbine generator converting mechanical energy to electrical energy, the method comprising:

determining an electromagnetic power reference representing the electromagnetic power generated by the wind turbine generator, wherein the electromagnetic power reference is determined based on a desired output of the wind turbine generator, controlling the electrical power generated by the wind turbine generator using a control signal, wherein the control signal is derived from the electromagnetic power reference and is modified in dependence on an inverse power function of the wind turbine generator such that non-linearity of the wind turbine generator is compensated;

determining a first field power stator flux or stator current reference based on a first criterion and the electromagnetic power reference;

determining a second field power stator flux or stator current reference based on a second criterion and the electromagnetic power reference;

selecting one of the first field power stator flux or current reference and the second field power stator flux or stator current reference; and controlling a stator flux or current of the wind turbine generator based on the selected field power stator flux or current reference;

wherein selecting one of the first field power stator flux or stator current reference and the second field power stator flux or stator current reference comprises:

comparing an absolute value of the first field power stator flux or stator current reference and an absolute value of the second field power stator flux or stator current reference; and selecting the one of the first field power stator flux or stator current reference and the second field power stator flux or stator current reference which has the smaller absolute value.

8. The method of claim 7, wherein the first criterion comprises a minimal copper loss constraint.

9. The method of claim 7, wherein the second criterion comprises a voltage limiting constraint.

10. A method of controlling a wind turbine generator, the wind turbine generator converting mechanical energy to electrical energy, the method comprising:

determining an electromagnetic power reference representing the electromagnetic power generated by the wind turbine generator, wherein the electromagnetic power reference is determined based on a desired output of the wind turbine generator, controlling the electrical power generated by the wind turbine generator using a control signal, wherein the control signal is derived from the electromagnetic power reference and is modified in dependence on an inverse power function of the wind turbine generator such that non-linearity of the wind turbine generator is compensated;

determining a first field power stator flux or stator current reference based on a first criterion and the electromagnetic power reference;

determining a second field power stator flux or stator current reference based on a second criterion and the electromagnetic power reference;

selecting one of the first field power stator flux or current reference and the second field power stator flux or stator current reference;

controlling a stator flux or current of the wind turbine generator based on the selected field power stator flux or current reference;

determining a first reluctance power stator flux or stator current reference based on a third criterion and the selected field power stator flux or stator current reference;

determining a second reluctance power stator flux or stator current reference based on a fourth criterion and on the selected field power stator flux or stator current reference;

selecting one of the first reluctance power stator flux or stator current reference and the second reluctance power stator flux or stator current reference; and controlling the stator flux or stator current of the wind turbine generator based on the selected field power stator flux or stator current reference and the selected reluctance power stator flux or stator current reference.

11. The method of claim 10, wherein selecting one of the first reluctance power stator flux or stator current reference and the second reluctance power stator flux or stator current reference comprises:

comparing an absolute value of the first reluctance power stator flux or stator current reference and an absolute value of the second reluctance power stator flux or stator current reference; and selecting the one of the first reluctance power stator flux or stator current reference and the second reluctance power stator flux or stator current reference which has the smaller absolute value.

12. The method of claim 10, wherein the computation of the first reluctance power stator flux or stator current reference and the second reluctance power stator flux or stator current reference is carried out analytically.

13. The method of claim 10, wherein the third criterion comprises a generator minimal copper loss constraint.

14. The method of claim 10, wherein the fourth criterion comprises a generator voltage limiting constraint.

15. An apparatus for controlling electrical power generated by a wind turbine generator, the apparatus comprising:

a determining unit adapted to determine an electromagnetic power reference, wherein the electromagnetic power reference represents the electromagnetic power generated by the wind turbine generator and is determined based on a desired output of the wind turbine generator, and a controlling unit adapted to control the electrical power generated by the wind turbine generator using a control signal, wherein the control signal is derived from the electromagnetic power reference and is modified in dependence on an inverse power function of the wind turbine generator such that non-linearity of the wind turbine generator is compensated, wherein the controlling unit comprises a linear control sub-unit and a linearization sub-unit coupled to the linear control sub-unit, wherein the control signal is routed from a linear control unit through the linearization sub-unit and then fed into a linear control sub-system, wherein the linearization unit is adapted to linearize the control signal such that non-linearity of the wind turbine generator is compensated;

wherein the controlling unit comprises:

a first determining sub-unit adapted to determine a first field power stator flux or stator current reference based on a first criterion in dependence on the electromagnetic power reference;

a second determining sub-unit adapted to determine a second field power stator flux or stator current reference based on a second criterion in dependence on the electromagnetic power reference;

a selection subunit adapted to select one of the first field power stator flux or stator current reference and the second field power stator flux reference or stator current reference; and a controlling subunit adapted to control a stator flux or current of the wind turbine generator based on the selected field power stator flux or stator current reference, wherein the second determining sub-unit determines the second field power stator flux or stator current reference by:

determining a first preliminary field power stator flux or stator current reference based on the electromagnetic power reference obtained at a partial field weakening speed (speed at which field weakening operation starts) of the wind turbine generator;

determining a second preliminary field power stator flux or stator current reference based on the electromagnetic power reference obtained at a maximum speed of the wind turbine generator; and determining a weighted average of the first preliminary field power stator flux or stator current reference and the second preliminary field power stator flux or stator current reference in order to obtain the second field power stator flux or stator current reference.

16. The apparatus of claim 15, wherein the first determining sub-unit and the second determining sub-unit are adapted such that the first field power stator flux or stator current reference is calculated using look-up tables or polynomial functions.

17. The apparatus of claim 15, wherein the wind turbine generator is an interior permanent magnet generator.

18. A wind turbine generator, comprising an apparatus of claim 15.

19. The apparatus of claim 15, wherein the first criterion comprises a minimal copper loss constraint.

20. The apparatus of claim 15, wherein the second criterion comprises a voltage limiting constraint.

* * * * *